United States Patent

Getman et al.

[11] Patent Number: 6,148,665
[45] Date of Patent: *Nov. 21, 2000

[54] ARRANGEMENT FOR ESTABLISHING AND/ OR MONITORING A PREDETERMINED FILLING LEVEL IN A CONTAINER

[75] Inventors: Igor Getman; Sergej Lopatin, both of Lörrach, Germany

[73] Assignee: Endress + Hauser GmbH + Co., Maulburg, Germany

[ * ] Notice: This patent is subject to a terminal disclaimer.

[21] Appl. No.: 09/055,179

[22] Filed: Apr. 3, 1998

Related U.S. Application Data

[60] Provisional application No. 60/051,606, Jul. 2, 1997.

[30] Foreign Application Priority Data

Apr. 30, 1997 [EP] European Pat. Off. .............. 97107154

[51] Int. Cl.[7] .............................. G01F 23/28; G08B 21/00
[52] U.S. Cl. .......................... 73/290 V; 73/291; 340/620; 340/621
[58] Field of Search .................................. 73/290 V, 291, 73/861.27; 340/620, 621; 310/317; 367/908

[56] References Cited

U.S. PATENT DOCUMENTS

| | | | |
|---|---|---|---|
| 3,266,311 | 8/1966 | Andreasen et al. | 340/621 |
| 5,191,316 | 3/1993 | Dreyer | 340/621 |
| 5,264,831 | 11/1993 | Pfeiffer | 340/621 |
| 5,408,168 | 4/1995 | Pfandler | 318/642 |
| 5,625,343 | 4/1997 | Rottmar | 340/620 |
| 5,631,633 | 5/1997 | Dreyer et al. | 340/621 |
| 5,895,848 | 4/1999 | Wilson et al. | 73/290 V |
| 5,969,621 | 10/1999 | Getman et al. | 340/621 |

FOREIGN PATENT DOCUMENTS

| | | |
|---|---|---|
| 63008582 | 1/1988 | European Pat. Off. . |
| 39 31 453 | 2/1991 | Germany . |
| 42 01 360 | 7/1993 | Germany . |
| 44 02 234 | 4/1995 | Germany . |
| 44 19 617 | 12/1995 | Germany . |
| 44 39 879 | 2/1996 | Germany . |

*Primary Examiner*—Hezron Williams
*Assistant Examiner*—Michael Cygan
*Attorney, Agent, or Firm*—Bose McKinney & Evans LLP

[57] ABSTRACT

An arrangement for establishing and/or monitoring a predetermined filling level is described, in which a fixed phase difference ($\Delta\phi_R$), which is independent of the oscillation quality of the arrangement, exists between a transmission signal and a reception signal (E) at the resonant frequency of the mechanical oscillatory structure. This arrangement comprises a mechanical oscillatory structure (1) at least one transmitter (3), which excites the oscillatory structure (1) to produce oscillations, and two piezoelectric elements as receivers (24a, 24b). In accordance with a first variant, a first signal line (241a) of the first receiver (24a) is connected to an electrode which is arranged on a surface which bounds the first receiver (24a) in a direction opposite to its polarization. A second signal line (241b) of the second receiver (24b) is connected to the transmission signal line (5) via an electrical impedance (Z). The second signal line (241b) of the second receiver (24b) is connected to an electrode which is arranged on a surface which bounds the receiver (24b) in the direction of its polarization. The reception signal (E) is equal to the difference between the two electrical signals ($E_1$, $E_2$).

17 Claims, 7 Drawing Sheets

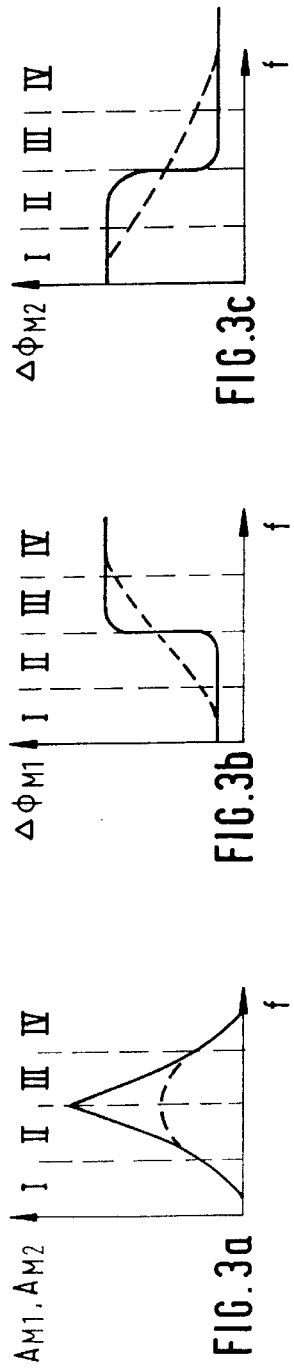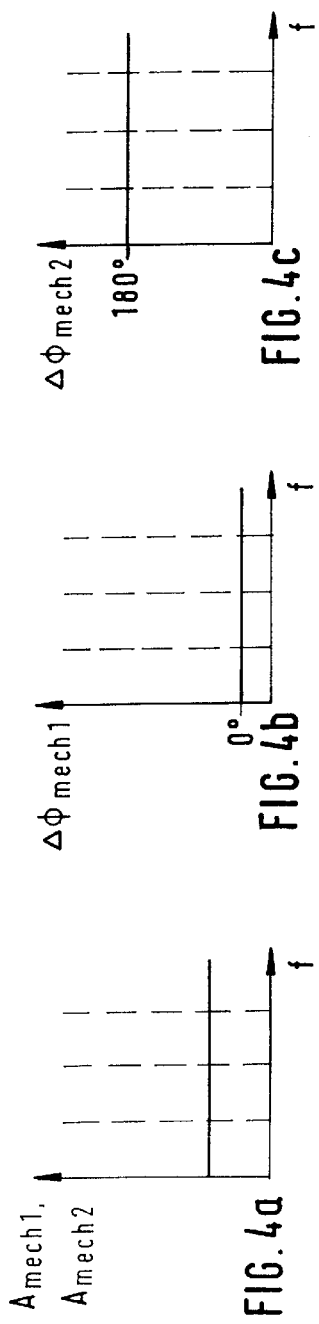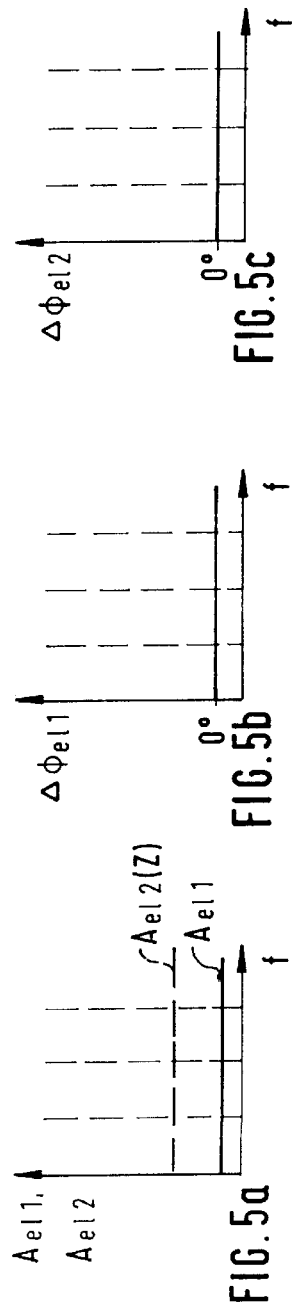

ARRANGEMENT FOR ESTABLISHING AND/OR MONITORING A PREDETERMINED FILLING LEVEL IN A CONTAINER

This application claims the benefit of U.S. Provisional Application No. 60/051,606 filed Jul. 2, 1997.

The invention relates to an arrangement for establishing and/or monitoring a predetermined filling level in a container, which arrangement has a mechanical oscillatory structure, which is fitted at the level of the predetermined filling level and is excited by an electro-mechanical transducer to produce oscillations. The oscillations of the mechanical oscillatory structure are picked up and converted into electrical signals. A reception signal is produced which indicates whether or not the mechanical oscillatory structure is covered by a charge material.

Filling level limit switches of this type are employed in many branches of industry, in particular in the chemical industry and in the foodstuffs industry. They serve the purpose of limit level detection and are used, for example, as a protection against overfilling or as a safeguard against pumps running dry.

DE-A 44 19 617 describes an arrangement for establishing and/or monitoring a predetermined filling level in a container. This arrangement comprises:

- a mechanical oscillatory structure, which is fitted at the level of the predetermined filling level,
- piezoelectric elements,
  - of which at least one is a transmitter, to which, during operation, an electrical transmission signal is applied via a transmission signal line and which excites the oscillatory structure to produce mechanical oscillations,
  - of which one is a first receiver and one is a second receiver,
  - the first and the second receiver picking up the mechanical oscillations of the oscillatory structure and converting them into electrical signals,
  - the first and the second receiver each having two electrodes, a first electrode of which is arranged on a surface which bounds the receiver in the direction of its polarization and a second electrode of which is arranged on a surface which bounds the receiver in a direction opposite to its polarization,
  - the electrical signal of the first receiver being picked off, during operation, via a first signal line,
  - the electrical signal of the second receiver being picked off, during operation, via a second signal line, and
- a circuit, which produces a reception signal from the two electrical signals.

In the arrangement described, each receiver is assigned a reception channel via which the signals are accessible for further processing. The evaluation is carried out by alternately using the signals of one or the other channel.

In the evaluation unit, the frequency of the reception signal is determined and compared with a reference frequency, and an output signal is generated which indicates that the mechanical oscillatory structure is covered by a charge material when the frequency has a value which is less than the reference frequency, and that it is not covered when the value is greater.

A control loop is provided, which regulates a phase difference existing between the electrical transmission signal and the electrical signal to a specific, constant value at which the oscillatory structure oscillates at a resonant frequency.

The control loop is formed, for example, in that the respective signal that is currently being used is amplified and fed back to the transmission signal via a phase shifter.

To date, it has not been possible to employ arrangements of this type additionally for measurements in highly viscous media or in hydrous or viscous foams, since reliable excitation of the mechanical oscillatory structure to produce oscillations at the resonant frequency is not ensured in these applications.

First investigations which led to the invention described below showed that the cause of this lies in the fact that the arrangement described is a complex oscillatory system composed of the mechanical oscillatory structure, the electro-mechanical transducer and the control loop. The individual components are not completely isolated electrically and separated mechanically from one another. Both electrical and mechanical coupling occur.

The fixed value of the phase difference corresponds to the resonance of the system when the oscillatory structure oscillates in gases or in liquids. However, if the oscillation quality of the arrangement is reduced for any reason, then the consequence of this is that the fixed value of the phase difference no longer exists. Starting from a specific reduction in the oscillation quality, there is no frequency at which the signal has an amplitude different from zero and the phase difference has the fixed value. Consequently, this phase difference cannot be set by the control loop. Incorrect functioning consequently occurs.

A reduction in the oscillation quality occurs, for example, when the movement of the mechanical oscillatory structure is attenuated, for example by the latter being immersed in a viscous medium or in a liquid-containing or viscous foam. Furthermore, the oscillation quality is reduced by energy losses within the arrangement, for example due to instances of material fatigue or instances of asymmetry, for example on account of asymmetrical deposit formation, which lead to asymmetrical restoring forces. In principle, any type of energy lose, be it oscillation energy released to a charge material or energy released to the container via a fastening of the arrangement, leads to a reduction in the oscillation quality.

One object of the invention is to specify an arrangement for establishing and/or monitoring a predetermined filling level in a container, in which the reception signal corresponds as far as possible to the desired measurement signal and in which the phase and amplitude of the reception signal over the frequency exhibit as far as possible the same profile as the phase and amplitude of the actual measurement signal.

A further object of the invention consists in specifying an arrangement of this type in which a fixed phase difference, which is independent of the oscillation quality of the arrangement, exists between the transmission signal and the reception signal at the resonant frequency of the mechanical oscillatory structure.

These objects are achieved in accordance with a first variant of the invention by means of an arrangement for establishing and/or monitoring a predetermined filling level in a container, which arrangement comprises:

- a mechanical oscillatory structure, which is fitted at the level of the predetermined filling level,
- piezoelectric elements arranged in a stack,
  - of which at least one is a transmitter, to which, during operation, an electrical transmission signal is applied via a transmission signal line and which excites the oscillatory structure to produce mechanical oscillations,
  - of which one is a first receiver and one is a second receiver,
  - the first and the second receiver picking up the mechanical oscillations of the oscillatory structure and converting them into electrical signals, the first and the second receiver each having two electrodes, a first electrode of which is arranged on a surface which bounds the receiver in the direction of its polarization and a second electrode of which is arranged on a surface which bounds the receiver in a direction opposite to its polarization, the electrical signal of the first receiver being picked off via a first signal line, which is connected to the second electrode of the first receiver, and the electrical signal of the second receiver being picked off via a second signal line, which is connected to the first electrode of the second receiver, an electrical impedance, via which the second signal line is connected to the transmission signal line, and a circuit, which produces a reception signal from the two electrical signals, which reception signal is equal to the difference between the two electrical signals.

In accordance with a second variant, these objects are achieved by means of an arrangement for establishing and/or monitoring a predetermined filling level in a container, which arrangement comprises:

a mechanical oscillatory structure, which is fitted at the level of the predetermined filling level, piezoelectric elements arranged in a stack, of which at least one is a transmitter, to which, during operation, an electrical transmission signal is applied via a transmission signal line and which excites the oscillatory structure to produce mechanical oscillations, of which one is a first receiver and one is a second receiver, the first and the second receiver picking up the mechanical oscillations of the oscillatory structure and converting them into electrical signals, the first and the second receiver each having two electrodes, a first electrode of which is arranged on a surface which bounds the receiver in the direction of its polarization and a second electrode of which is arranged on. a surface which bounds the receiver in a direction opposite to its polarization, the electrical signal of the first receiver being picked off via a first signal line, which is connected to the first electrode of the first receiver, and the electrical signal of the second receiver being picked off via a second signal line, which is connected to the first electrode of the second receiver, an electrical impedance, via which the second signal line is connected to the transmission signal line, and a circuit, which produces a reception signal from the two electrical signals, which reception signal is equal to the sum of the two electrical signals.

In accordance with a development of the invention, the evaluation unit determines the frequency of the reception signal, compares this frequency with a reference frequency and generates an output signal which indicates that the mechanical oscillatory structure is covered by a charge material when the frequency has a value which is less than the reference frequency, and that it is not covered when the value is greater.

In accordance with a further development, the arrangement has a control loop which regulates a phase difference existing between the electrical transmission signal and the electrical reception signal to a specific, constant value at which the oscillatory structure oscillates at a resonant frequency.

In accordance with a further embodiment, the impedance is a capacitance. In accordance with a different embodiment, the impedance is a resistance, an inductance or a combination of at least one resistance and/or at least one inductance and/or at least one capacitance.

In accordance with an embodiment of the first solution variant, the first electrode of the first receiver and the second electrode of the second receiver are each connected via a line to a reference potential, in particular the ground potential.

In accordance with an embodiment of the second solution variant, the second electrode of the first receiver and the second electrode of the second receiver are each connected via a line to a reference potential, in particular the ground potential.

In accordance with one embodiment of the invention, the first and the second electrical signal each contain three components, namely a measurement signal, which is governed by the oscillation of the mechanical oscillatory structure, a first additional signal, which is governed by a mechanical coupling between the transmitter and the receiver, and a second additional signal, which is governed by an electrical coupling between the transmitter and the receiver, and the impedance is determined such that the amplitude of the second additional signal of the second receiver is greater than the amplitude of the first additional signal of the first receiver.

In accordance with a further embodiment, an amplitude- and phase-accurate sum of the first and of the second additional signal of the first receiver has an amplitude which is equal to an amplitude of the amplitude- and phase-accurate sum of the first and of the second additional signal of the second receiver.

In accordance with one embodiment, an anti-resonant frequency of the first receiver is greater than a resonant frequency of the mechanical oscillatory structure, and an anti-resonant frequency of the second receiver is less than the resonant frequency.

The invention and further advantages will now be explained in more detail with reference to the figures of the drawing, in which an exemplary embodiment in accordance with the first variant and an exemplary embodiment in accordance with the second variant are illustrated; identical elements are provided with identical reference symbols in the figures.

FIG. 3a shows the amplitude of a measurement signal of a first or of a second receiver as a function of the frequency for a high and for a low oscillation quality;

FIG. 3b shows the phase of the measurement signal of the first receiver as a function of the frequency for a high and for a low oscillation quality;

FIG. 3c shows the phase of the measurement signal of the second receiver as a function of the frequency for a high and for a low oscillation quality;

FIG. 4a shows the amplitude of a first additional signal of the first or of the second receiver as a function of the frequency;

FIG. 4b shows the phase of the first additional signal of the first receiver as a function of the frequency;

FIG. 4c shows the phase of the first additional signal of the second receiver as a function of the frequency;

FIG. 5a shows the amplitude of a second additional signal of the first receiver, as a continuous line, and of the second receiver, as a dashed line, as a function of the frequency;

FIG. 5b shows the phase of the second additional signal of the first receiver as a function of the frequency;

FIG. 5c shows the phase of the second additional signal of the second receiver as a function of the frequency;

Figure 1:
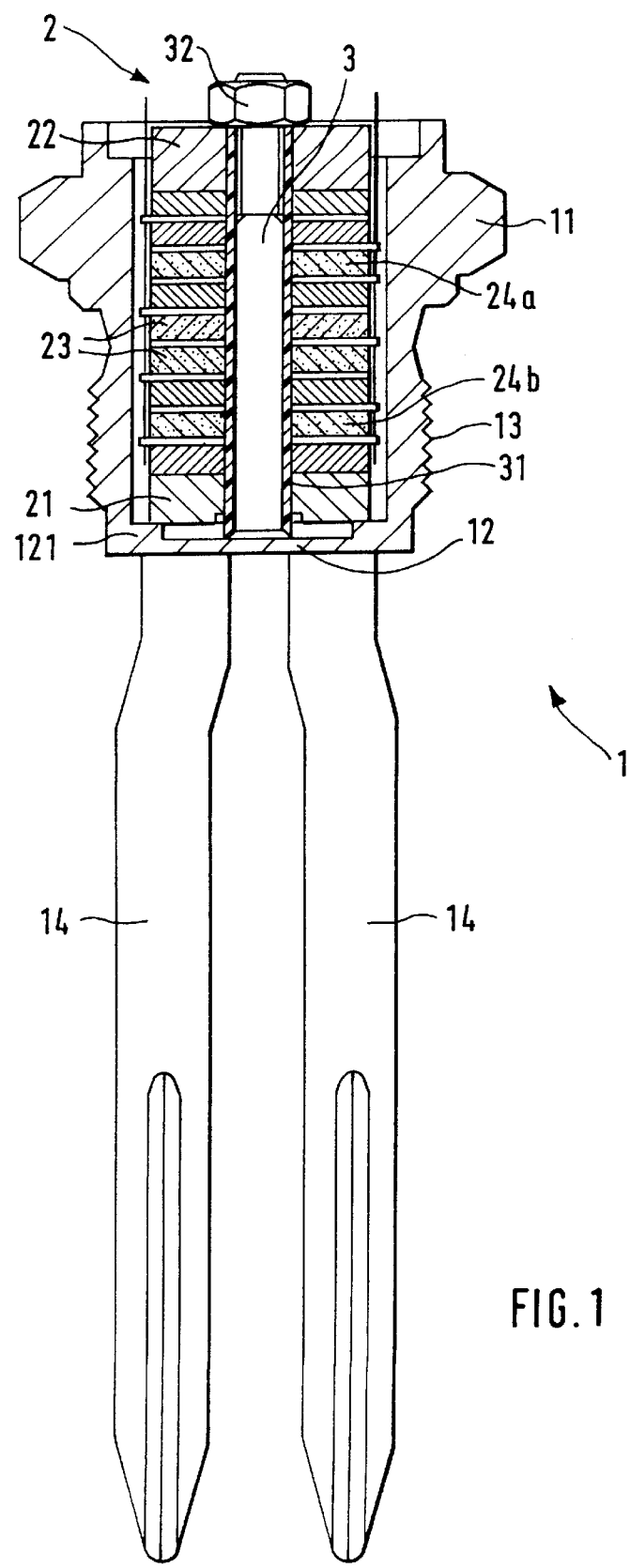
FIG. 1 shows a longitudinal section through a mechanical oscillatory structure and an electromechanical transducer.

FIG. 1 shows a longitudinal section through an exemplary embodiment of a mechanical oscillatory structure 1. It has an essentially cylindrical housing 11, which is closed off flush at the front by a circular diaphragm 12. A thread 13 is integrally formed on the housing 11, by means of which thread the arrangement can be screwed into an opening (not illustrated), which is arranged at the level of the predetermined filling level, in a container. Other fastening methods which are known to a person skilled in the art, for example by means of flanges integrally formed on the housing 11, can likewise be employed.

Two oscillating bars 14 which point into the container are integrally formed on the diaphragm 12 on the outside of the housing 11. These bars are caused to oscillate perpendicularly to their longitudinal axis by means of an electromechanical transducer 2 arranged in the interior of the housing 11.

However, the invention is not restricted to mechanical oscillatory systems having two oscillating bars; it can also be employed in limit switches which have only one or no oscillating bars. In the cases mentioned last, for example only the oscillating diaphragm comes into contact with a charge material situated in the container.

The transducer 2 has four annular piezoelectric elements arranged in a stack. A respective metal ring 21, 22 is arranged at both ends of the stack. The metal ring 21 facing the diaphragm bears on an annular shoulder 121, which is integrally formed on an outer annular surface of the diaphragm 12. A tensioning bolt 3 pointing into the interior of the housing 11 is provided in the center of the diaphragm 12. This bolt is provided with insulation 31 and passes through the transducer 2. A nut 32 is screwed onto that end of the tensioning bolt 3 which is remote from the diaphragm. This nut bears on the metal ring 22 which is remote from the diaphragm. The nut 32 is tightened. The diaphragm 12 is thus pretensioned.

Figure 2:
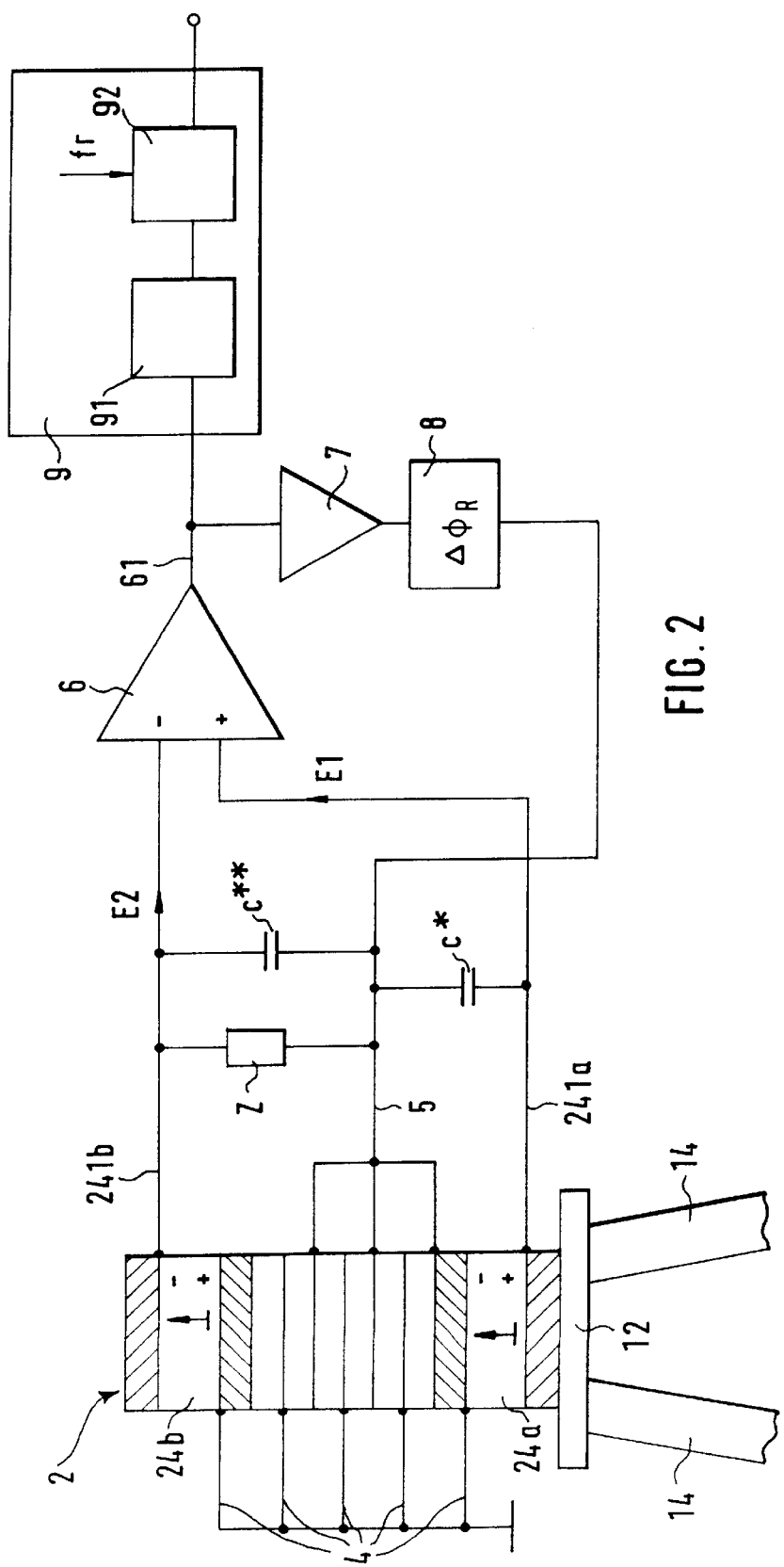
FIG. 2 shows a diagrammatic illustration of the transducer of FIG. 1 and a circuit connected thereto in accordance with a first variant.

The two piezoelectric elements situated in the center of the stack operate as transmitters 23. The two outer piezoelectric elements serve as first and second receivers 24a and 24b. FIG. 2 shows a diagrammatic illustration of a first exemplary embodiment of the transducer 2 and an evaluation unit connected thereto.

The transmitters 23 and the receivers 24a, 24b each have two electrodes. The latter are arranged on mutually opposite surfaces of the piezoelectric elements.

One electrode of each transmitter 23 is connected via a line 4 to a reference potential, for example ground. The respective other electrode of the transmitters 23 is in each case connected to a transmission signal line 5.

All of the piezoelectric elements, in other words the transmitters 23 and the receivers 24a, 24b, are in each case polarized parallel to the longitudinal axis of the stack.

The first and the second receiver 24a, 24b each have a first and a second electrode. The first electrode is arranged on a surface which bounds the respective receiver 24a, 24b in the direction of its polarization, and the second electrode is arranged on a surface which bounds the respective receiver 24a, 24b in a direction which is opposite to its polarization.

During operation, the electrical reception signals $E_1$, $E_2$ of the first and of the second receiver 24a, 24b are respectively picked off via one of the signal lines 241a, 241b connected to one of the electrodes of the receivers 24a, 24b. The other electrode remaining in each case is connected to the reference potential via a line 4 in each case.

The direction of polarization of the transmitters 23 should be selected such that all of the transmitters 23 execute in-phase thickness oscillations as a function of an AC voltage present on the transmission signal line 5. The height of the stack oscillates correspondingly. Since the stack is clamped in by the tensioning bolt 3, the nut 32 and the shoulder 121 and is coupled to the diaphragm 12, the diaphragm 12 is excited by these thickness oscillations to produce flexural vibrations. The oscillating bars 14 are fixedly connected to the diaphragm 12 at their ends. Flexural vibrations of the diaphragm 12 consequently cause the oscillating bars 14 to oscillate perpendicularly to their longitudinal axis.

An oscillation of the oscillating bars 14 correspondingly leads to a flexural vibration of the diaphragm 12, which in turn effects a thickness oscillation of the stack. This thickness oscillation leads to a change in the voltage drops across the receivers 24a, 24b. A corresponding signal $E_1$, $E_2$ is available via the respective signal line 241a, 241b.

The amplitude of these electrical signals $E_1$, $E_2$ is larger, the larger the mechanical oscillation amplitude of the oscillating bars 14 is. To exploit this fact, the arrangement is preferably operated at its resonant frequency $f_r$. The mechanical oscillation amplitude is a maximum at the resonant frequency $f_r$.

If a harmonic oscillator is considered as an example of an ideal oscillatory system, then its oscillation amplitude has a single maximum as a function of the oscillation frequency. The phase difference between the oscillation excitation and the oscillation of the oscillator experiences a sudden phase change of 180° in the region of this maximum. At the resonant frequency, the oscillation amplitude is a maximum and the phase difference is 90°.

Based on the same fundamental physical principle, a fixed phase relationship between the transmission signal and each of the electrical signals $E_1$, $E_2$ exists in the case of resonance in the present arrangement, too. The fixed value of this phase difference is dependent on the polarization of the transmitters 23 and of the receivers 24a, 24b and on the mechanical and electrical oscillation properties of the arrangement. Measurements have shown that the values generally lie between 60° and 90°.

In order that the mechanical oscillatory structure is caused to oscillate at its resonant frequency $f_r$, the arrangements from the prior art described in the introduction have a control loop, which regulates a phase difference existing between the transmission signal and one of the electrical signals $E_1$, $E_2$ to a specific, constant value $\Delta\phi_R$. for example in that one of the electrical signals $E_1$, $E_2$ is fed back to the transmission signal via a phase shifter and an amplifier. In the arrangement described in DE-44 19 617, one or the other of the two receiver signals is used alternately.

In a harmonic oscillator, attenuation or reduction of the oscillation quality effects a reduction in the maximum amplitude in the case of resonance. In such a case, the phase increases as a function of the frequency proceeds continuously rather than abruptly, to be precise it proceeds all the more slowly, the greater the attenuation or the reduction of the oscillation quality is. Overall, however, even with very great attenuation, a phase change of a total of 180° ensues and a phase difference of 90° exists at the resonant frequency. The fixed value, corresponding to resonance, of the phase difference of 90° always exists and is assumed at the resonant frequency $f_r$.

In contrast to an ideal oscillator, in the abovementioned arrangements from the prior art, couplings of an electrical and mechanical nature exist between the transmitters 23, the receivers 24a, 24b and the mechanical oscillatory structure. The mechanical coupling is essentially governed by the mechanical clamping-in of the transducer 2. Thus, for example, the transmission signal exciting the transmitter 23 leads to an electrical signal $E_1$ or $E_2$ even when the oscillating bars 14 are restrained and are consequently not moving.

The electrical coupling exists between the transmitters 23 and the receivers 24a, 24b. These are not, as is assumed ideally, electrically independent of one another, rather there exists a, as a rule capacitive, connection between them. This connection is illustrated in FIG. 2, in the form of an equivalent circuit diagram, by the capacitances C*, C** inserted between the transmission signal line 5 and the respective signal lines 241a, 241b.

If just one receiver 24a is considered, then its signal $E_1$ is composed of three components, namely a measurement signal $E_{M1}$, a first additional signal $E_{mech1}$, which is governed by the mechanical coupling, and a second additional signal $E_{el1}$, which is governed by the electrical coupling.

$$E_1 = E_{M1} + E_{el1} + E_{mech1}$$

The polarization of a piezoelectric element is equal to the direction of an electric field caused by the piezoelectric effect, in other words from a positively charged side to a negatively charged side, when the piezoelectric element is compressed parallel to the longitudinal axis of the stack.

In the exemplary embodiment shown, the polarization of the first receiver 24a points in the direction facing away from the diaphragm. A surface of the first receiver 24a which is remote from the diaphragm bounds the receiver 24a in the direction of its polarization. A surface of the first receiver 24a which faces the diaphragm bounds said receiver in a direction which is opposite to its polarization. Correspondingly, in the exemplary embodiment illustrated in FIG. 2, the first electrode of the first receiver is situated on the surface remote from the diaphragm and the second electrode is situated on the surface facing the diaphragm.

The second electrode, which is arranged on the surface of the first receiver 24a facing the diaphragm, is connected to the signal line 241a, and the first electrode, which is arranged on the surface of the first receiver 24a remote from the diaphragm, is connected via the line 4 to the reference potential.

Equivalent to this is an arrangement in which the polarization of the first receiver 24a points in the direction facing the diaphragm and the second electrode remote from the diaphragm is connected to the signal line 241a.

The measurement signal $E_{M1}$ is based on the oscillation of the mechanical oscillatory structure and has a frequency-dependent amplitude $A_{M1}$ (f) and a frequency-dependent phase $\Delta\phi_{M1}$ (f). Here phase in each case denotes the phase offset of the respective component of the electrical signal $E_1$ with reference to the electrical transmission signal.

FIG. 3a shows the amplitude $A_{M1}$ (f) and FIG. 3b the phase $\Delta\phi_{M1}$ (f) of the measurement signal $E_{M1}$ as a function of the frequency f. The curves can be determined computationally by simulation calculations, for example by finite element calculations. They can be measured experimentally by connecting the transmission signal line 5 to a frequency generator and by determining the phase and amplitude of the oscillation of the oscillating bars 14 as a function of the frequency of the frequency generator, using a laser vibrometer, for example.

In each of the two figures, the continuous line corresponds to an arrangement having a high oscillation quality and the dashed line corresponds to an arrangement having a low oscillation quality. In both cases, both the amplitude $A_{M1}$ (f) and the phase $\Delta\phi_{M1}$ (f) of the measurement signal have the profile which is typical of a harmonic oscillator and has already been described above.

On account of the method of connecting the first receiver 24a referring to its polarization, the phase $\Delta\phi_{M1}$ (f) of the measurement signal $E_{M1}$ (f) is 0° below the resonant frequency $f_r$ and 180° above the resonant frequency $f_r$.

The two additional signals $E_{mech1}$, $E_{el1}$ each have an essentially constant amplitude $A_{mech1}$, $A_{el1}$ and an essentially constant phase $\Delta\phi_{mech1}$, $\Delta\phi_{el1}$. In this case, too, phase denotes the phase offset of the respective component of the electrical signal $E_1$ with reference to the electrical transmission signal.

The phase $\Delta\phi_{mech1}$ of the first additional signal $E_{mech1}$ is constant and equal to the phase $\Delta\phi_{M1}$ (f) which the measurement signal $E_{M1}$ (f) assumes asymptotically for very small frequencies.

The phase $\Delta\phi_{el1}$ of the second additional signal $E_{el1}$ is likewise constant and, in addition, independent of the polarization of the receiver. It is always approximately 0°.

FIG. 4a shows the amplitude $A_{mech}$ and FIG. 4b the phase $\Delta\phi_{mech1}$ of the first additional signal $E_{mech1}$ as a function of the frequency f. The curves can be determined computationally by simulation calculations, for example by finite element calculations. They can be measured experimentally when the other two signal components, namely the measurement signal $E_{M1}$ and the second additional signal $E_{el1}$, are suppressed.

The measurement signal $E_{M1}$ can be eliminated by restraining the oscillating bars 14 such that they are mechanically fixed. The second additional signal $E_{el1}$ can be avoided by electrical insulation of the receiver 24a, for example in the form of a grounded metallic shield. It is also recommendable, if possible, to use short lines, in order to keep down the coupling in of electrical signals of any type.

If the measurement signal $E_{M1}$ and the second additional signal $E_{el1}$ are suppressed, that is to say if their amplitude has a value of almost zero, then the signal $E_1$ is equal to the first additional signal $E_{mech1}$ and can be measured by means of an oscilloscope, for example.

The continuous line in FIG. 5a shows the amplitude $A_{el1}$ and the continuous line in FIG. 5b the phase $\Delta\phi_{el1}$ of the second additional signal $E_{el1}$ of the first receiver 24a as a function of the frequency f. These curves, too, can be determined by simulation calculations. They can be recorded experimentally by, for example, employing non-polarized piezoelectric elements as transmitters 23 and as receivers 24a, 24b. In these, no mechanical motion at all is generated by a transmission signal, and the signal $E_1$ consequently corresponds to the second additional signal $E_{el1}$ based on electrical coupling. The latter signal can likewise be measured by means of an oscilloscope.

The amplitudes $A_{mech1}$, $A_{el1}$ and the phases $\Delta\phi_{mech1}$, $\Delta\phi_{el1}$ of the additional signals $E_{mech1}$, $E_{el1}$ are virtually frequency-independent and are unambiguously related to the mechanical structure of the respective arrangement and to the electrical and mechanical properties of the transmitters 23 and of the receivers 24a, 24b. The amplitude $A_{mech1}$ is typically substantially greater than the amplitude $A_{el1}$.

Figure 6A:
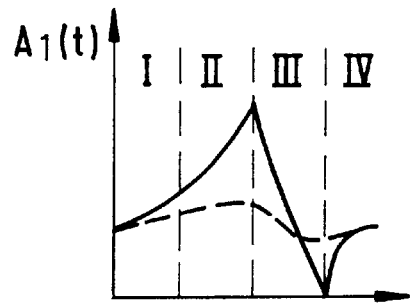
FIG. 6a shows the amplitude of the signal of the first receiver as a function of the frequency for a high and for a low oscillation quality.
Figure 6B:
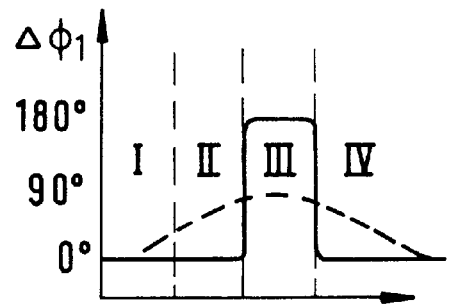
FIG. 6b shows the phase of the signal of the first receiver as a function of the frequency for a high and for a low oscillation quality.

FIG. 6a shows the amplitude $A_1$ (f) and FIG. 6b the phase $\Delta\phi_1$ (f) of the signal $E_1$. The two curves result from the phase- and amplitude-accurate superposition of the three above-described components of the signal $E_1$.

$$E_1 = A_1 e^{i\Delta\phi_1} = A_{M1} e^{i\Delta\phi_{M1}} + A_{mech1} e^{i\Delta\phi_{mech1}} + A_{el1} e^{i\Delta\phi_{el1}}$$

Both curves each have four regions I, II, III, IV, which are described in a greatly simplified manner below.

In a first region I, the first additional signal $E_{mech1}$ is predominant, since it has the largest amplitude $A_{mech1}$. The phase $\Delta\phi_{mech1}$ of this signal is equal to the phase $\Delta\phi_{M1}$ (f) of the measurement signal $A_{M1}$ (f) and is equal to the phase $\Delta\phi_{el1}$ of the second additional signal $A_{el1}$. The resulting amplitude $A_1$ (f) consequently corresponds to the sum of the amplitudes $A_{M1}$ (f), $A_{el1}$ and $A_{mech1}$.

$$A_1(f) \cong A_{mech1}(f) + A_{M1}(f) + A_{el1}$$

The resulting phase $\Delta\phi_1$ (f) is 0° in this region I.

In a second region II, the measurement signal $E_{M1}$ assumes the commanding role on account of its increasing amplitude $A_{M1}$ (f), which exceeds the amplitude $A_{mech1}$ of the first additional signal. Its phase $\Delta\phi_{M1}$ (f) is likewise 0° in this region II. Therefore, in this case as well, the amplitude $A_1$ of the resulting electrical signal $E_1$ (f) corresponds to the sum of the amplitudes of the measurement signal $A_{M1}$ (f), of the first additional signal $A_{mech1}$ and of the second additional signal $A_{el1}$.

$$A_1(f) \cong A_{M1}(f) + A_{el1} + A_{mech1}$$

The resonant frequency $f_r$ lies between the region II and a region III. The measurement signal $E_{M1}$ correspondingly has a sudden phase change of 180°. On account of its amplitude $A_{M1}$ (f), which is now decreasing but still exceeds the amplitude $A_{mech1}$ of the first additional signal, this signal is also predominant in the region III. Consequently, in the region III, the amplitude $A_1$ of the reception signal essentially corresponds to the amplitude $A_{M1}$ (f) of the measurement signal, which amplitude is reduced by the sum of the amplitude $A_{mech1}$ of the first additional signal and $A_{el1}$ of the second additional signal.

$$A_1(f) \cong A_{M1}(f) - (A_{mech1} + A_{el1})$$

It decreases corresponding to the decrease in the amplitude of the measurement signal $A_{M1}$ (f) with the frequency. The phase is approximately 180° in this region III. A region boundary between the region III and a region IV is given by the fact that the amplitude $A_{M1}$ (f) of the measurement signal is approximately equal to the sum of the amplitudes of the two additional signals $A_{mech1}$, $A_{el1}$. The frequency at which this takes place is referred to below as the antiresonant frequency $f_{ar1}$.

In the region IV, the first additional signal $E_{mech1}$ is again predominant on account of its amplitude $A_{mech1}$, which exceeds the amplitude $A_{M1}$ of the measurement signal. The amplitude $A_1$ of the electrical signal $E_1$ of the first electrode 24a increases in the region IV and is essentially equal to the sum of the two amplitudes $A_{mech1}$ and $A_{el1}$ of the two additional signals, which sum is reduced by the amplitude $A_{M1}$ (f) of the measurement signal.

$$A_1(f) \cong A_{mech1} + A_{el1} - A_{M1}(f)$$

The amplitude $A_1(f)$ assumes asymptotically, at very low and at very high frequencies ($f \rightarrow 0$; $f \rightarrow \infty$), a value which is equal to the sum $A_{mech1} + A_{el1}$. The phase $\Delta\phi_1$ (f) has a value of 0° in the region IV.

The phase difference between the electrical transmission signal and the electrical signal $E_1$ has, as a function of the frequency, two sudden phase changes each of 180° in opposite directions to one another. There are consequently two frequencies at which the phase $\Delta\phi_1$ (f) has the fixed value which corresponds to resonance and was described at the beginning, in this case 90°, namely at the region boundary between the region II and the region III and at the region boundary between the region III and the region IV. The amplitude of the electrical signal $E_1$ is negligibly small at the second frequency, which is referred to as the antiresonant frequency $f_{ar1}$. If the electrical signal $E_1$ were used to operate a control loop, which was described at the beginning, then the frequency-determining element of the control loop would be inactive on account of its negligibly small amplitude at the antiresonant frequency $f_{ar1}$. As a result, the feedback would be interrupted and the self-excitation condition could not be satisfied. The first frequency is essentially equal to the resonant frequency $f_r$ of the mechanical oscillatory structure. It is the critical frequency during operation of the arrangement and would be set automatically by a corresponding control loop.

If the situation now arises where the mechanical oscillatory structure is damped or has a reduced oscillation quality, then the amplitude $A_{M1}$ (f) and phase $\Delta\phi_{M1}$ (f) of the measurement signal exhibit the profile illustrated by dashed lines in FIGS. 3a and 3b. The amplitude $A_{M1}$ (f) rises and falls considerably more slowly with the frequency and has a distinctly lower maximum value. The phase $\Delta\phi_{M1}$ (f) does not exhibit a sudden phase change, but rather rises continuously with the frequency. The greater the reduction in the oscillation quality of the system is, the lower the maximum value of the amplitude is and the lower the gradient of the phase is. However, the phase $\Delta\phi_{M1}$ (f) always reaches the values 0° and 180° asymptotically and it is still 90° at the resonant frequency $f_r$. The additional signals $E_{el1}$, $E_{mech1}$ remain unchanged.

The amplitude $A_1$ (f) and phase $\Delta\phi_1$ (f) of the signal $E_1$ resulting from the amplitude- and phase-accurate superposition of the three components clearly differ from the example mentioned first, in which there was no reduction in the oscillation quality. The maxima of the amplitude $A_1$ (f) are a great deal less pronounced and the phase $\Delta\phi_1$ (f) has two continuous phase changes in opposite directions to one another instead of the two sudden phase changes each of 180° in opposite directions to one another. The maximum phase difference is clearly less than 180°. Depending on the oscillation quality of the system, it is even less than 90°. The figures show the amplitudes $A_1$, $A_2$ and the phases $\Delta\phi_1$, $\Delta\phi_2$ of the first and of the second electrical signal $E_1$, $E_2$ for this case as a dashed line each time.

If, therefore, damping of the mechanical oscillatory structure, for example in foam or in a viscous medium, or a different type of reduction in the oscillation quality of the system, for example caused by loosening of the mechanical connection between the piezoelectric elements operating as transmitters and the mechanical oscillatory structure, occurs, then the phase difference between the electrical transmission signal and the electrical signal $E_1$ admittedly still has, as a function of the frequency, two continuous phase changes in opposite directions to one another, but the maximum phase difference may be very small. The maximum phase difference is smaller, the smaller the interval between the resonant frequency $f_r$ and the antiresonant frequency $f_{ar1}$ is.

A control loop of the kind which can be found in the prior art, which excites the mechanical oscillatory system to produce oscillations at the resonant frequency $f_r$ in that it establishes a fixed phase relationship, corresponding to resonance, between the transmission signal and the signal $E_1$ of a receiver, exhibits incorrect functioning in this case. In order that the arrangement described is functional in the uncovered state in conjunction with a high oscillation quality, the phase difference would have to be 90°, for example. If the previously described situation where the phase $\Delta\phi_1$ (f) of the signal $E_1$ no longer assumes this fixed value of 90° over the entire frequency range now occurs on account of the properties of the charge material or on account of a reduction in the oscillation quality, then reliable excitation of the mechanical oscillatory system is no longer possible. The arrangement taken from the prior art is consequently not functional.

According to the first variant of the invention, the second signal line 241b of the second receiver 24b is connected to the transmission signal line 5 via an electrical impedence Z. The second signal line 241b of the second receiver 24b is connected to the first electrode of the second receiver 24, which electrode is arranged on a surface which bounds the receiver 24b in the direction of its polarization. The first signal line 241a of the first receiver 24a is, as already described, connected to the second electrode of the first receiver 24a, which electrode is arranged on the surface which bounds the first receiver 24a in a direction opposite to its polarization. A reception signal E is formed, which is equal to the difference between the two electrical signals $E_1$, $E_2$.

In the exemplary embodiment shown, the polarization of the second receiver 24b likewise points in the direction facing away from the diaphragm. The first electrode, which is arranged on that surface of the second receiver 24b which is remote from the diaphragm, is connected to the second signal line 241b, and the second electrode, which is arranged on the surface facing the diaphragm, is connected via the line 4 to the reference potential.

Equivalent to this is an arrangement in which the polarization of the second receiver 24b points in the direction facing the diaphragm and the first electrode facing the diaphragm is connected to the signal line.

The two signals $E_1$ and $E_2$ are superposed by means of an operational amplifier 6. The signal $E_1$ is present at the non-inverting input and the signal $E_2$ is present at the inverting input of the operational amplifier 6. The phase- and amplitude-accurate difference between the two electrical signals $E_1$ and $E_2$ is available, via a reception signal line 61, at the output of the operational amplifier 6.

The profile of the phase $\Delta\phi_1$ (f) and amplitude $A_1$ (f) of the first electrical signal $E_1$ of the first receiver 24a has already been described above in connection with FIGS. 3a, 3b to 6a, 6b.

The electrical signal $E_2$ of the second receiver 24b is composed of three components in the same way as the electrical signal $E_1$. The amplitudes $A_{M2}$ (f) and $A_{mech2}$ of the measurement signal $E_{M2}$ and of the first additional signal $E_{mech2}$ of the electrical signal $E_2$ are identical to the corresponding amplitudes of the electrical signal $E_1$ of the first receiver 24a.

$$A_{M1}=A_{M2};\ A_{mech1}=A_{mech2}$$

The phases $\Delta\phi_{M2}$ of the measurement signal $E_{M2}$ (f) and $\Delta\phi_{mech2}$ of the first additional signal $E_{mech2}$ of the second receiver 24b are offset by 180° with respect to the corresponding phases of the corresponding signals of the first receiver. The phase $\Delta\phi_{M2}$ of the measurement signal $E_{M2}$ (f) is illustrated in FIG. 3c. It is 180° below the resonant frequency $f_r$ and 0° above the resonant frequency $f_r$. The phase $\Delta\phi_{mech2}$ of the first additional signal $E_{mech2}$ of the second receiver 24b is 180°, as illustrated in FIG. 4c. The cause of this is that the signal $E_1$ of the first receiver 24a is connected via the signal line 241a of the first receiver 24a to the second electrode, which is arranged on the surface which bounds the first receiver 24a in a direction opposite to its polarization, and that the signal $E_2$ of the second receiver 24b is connected to the first electrode, which is arranged on the surface which bounds the second receiver 24b in its direction of polarization.

The electrical impedance Z effects electrical coupling between the transmitters 23 and the receiver 24b. The phase $\Delta\phi_{el2}$ of the second additional signal $E_{el2}$ remains essentially unchanged as a result of this. The phase $\Delta\phi_{el2}$ of the second additional signal $E_{el2}$, which is governed by the capacitive coupling, is independent of the polarization of the piezoelectric element. The phase $\Delta\phi_{el2}$ essentially does not depend on which electrode of the second receiver 24b the signal line 241b is connected to. It is therefore approximately 0°, in exactly the same way as the phase $\Delta\phi_{el1}$ of the first additional signal $E_{el1}$.

The impedance Z should preferably be dimensioned in such a way that the amplitude $A_{el2}$ (Z) of the second additional signal $E_{el2}$ of the second receiver 24b is greater than the amplitude $A_{mech1}$ of the first additional signal $E_{mech1}$ of the first receiver 24a

$$A_{el2}(Z)>A_{mech1}$$

and that an amplitude $k_{\Sigma 1}$ of a phase- and amplitude-accurate addition of the first and of the second additional signal $E_{mech1}+E_{el1}$ of the first receiver 24a is preferably equal to the amplitude $A_{\Sigma 2}$ of the phase- and amplitude-accurate addition of the first and of the second additional signal $E_{mech2}+E_{el2}$ of the second receiver 24b.

$$A_{\Sigma 1}=|A_{el1}e^{i\Delta\phi el1}+A_{mech1}e^{i\Delta\phi mech1}|$$
$$=|A_{el2}e^{i\Delta\phi el2}+A_{mech2}e^{i\Delta\phi mech2}|$$
$$=A_{\Sigma 2}$$

The impedance Z is, for example, a resistance, a capacitance, an inductance or a combination of the components mentioned.

Investigations have shown that, as a rule, it suffices to use a capacitor having a corresponding capacitance. An optimum value of the capacitance can either be determined in advance by means of model calculations or can be determined by a series of measurements to be carried out using a tunable capacitor, for example. A corresponding amplitude $A_{el2}$ (Z) of the second additional signal $E_{el2}$ is illustrated as a dashed line in FIG. 5a.

Figure 7A:
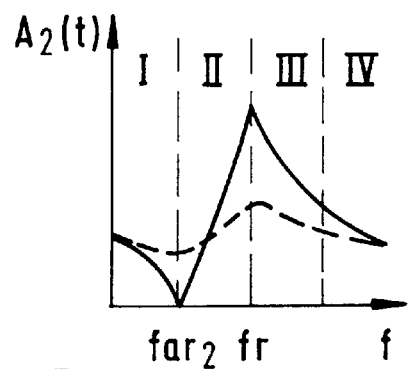
FIG. 7a shows the amplitude of the signal of the second receiver as a function of the frequency for a high and for a low oscillation quality.

Since this amplitude $A_{el2}$ (Z) is greater than the amplitude $A_{mech2}$ of the first additional signal $E_{mech2}$, the second additional signal $E_{el2}$ is predominant in the regions I and IV. Amplitude- and phase-accurate addition of the three components leads to the profile of the amplitude $A_2$ (f) of the second signal $E_2$ which is shown in FIG. 7a. The amplitude $A_2$ decreases monotonically in the first region I. At the region boundary with the region II, the amplitude $A_{el2}$ (Z) is approximately equal to the sum of the amplitude $A_{M2}$ (f) of the measurement signal $E_{M2}$ (f) and of the amplitude $A_{mech2}$ of the first additional signal $E_{mech2}$. The frequency corresponding to the region boundary is the antiresonant frequency $f_{ar2}$ of the second receiver 24b. The measurement signal $E_M$ (f) is predominant in the regions II and III. The amplitude $A_2$ (f) increases in the region II and decreases again in the region III. The region boundary between the region II and the region III corresponds to the resonant frequency $f_r$. The amplitude $A_2$ (f) decreases further in the region IV.

In the case of the signal $E_2$, the antiresonant frequency $f_{ar2}$ lies below the resonant frequency $f_r$, whereas in the case of the signal $E_1$, the antiresonant frequency $f_{ar1}$ lies above the resonant frequency $f_r$.

The amplitude $A_2$ of the electrical signal $E_2$ of the second receiver 24b assumes asymptotically, at very low and at very high frequencies (f→0; f→∞), a value which is equal to the difference $A_{el2}$ (Z)−$A_{mech2}$.

Figure 7B:
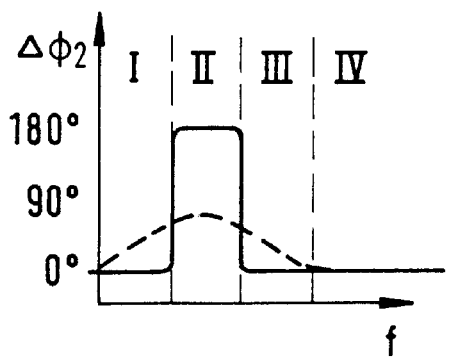
FIG. 7b shows the phase of the signal of the second receiver as a function of the frequency for a high and for a low oscillation quality.

The phase $\Delta\phi_2$ of the electrical signal of the second receiver 24b is illustrated in FIG. 7b. It is 0° in the region I, 180° in the region II and 0° in the regions III and IV.

If the oscillation quality of the arrangement is reduced, the amplitude $A_2$ and phase $\Delta\phi_2$ of the second electrical signal $E_2$ have the profile which is illustrated by dashed lines in FIGS. 7a and 7b.

Figure 8:
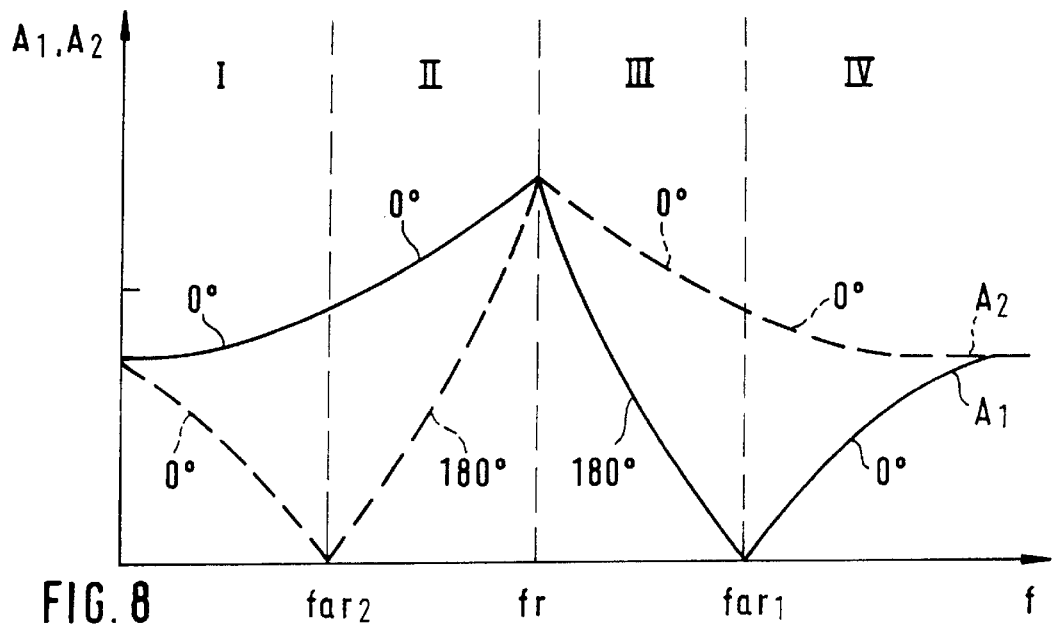
FIG. 8 shows the amplitudes of the two electrical signals of FIGS. 6a and 7a of an arrangement having a high oscillation quality.
Figure 9:
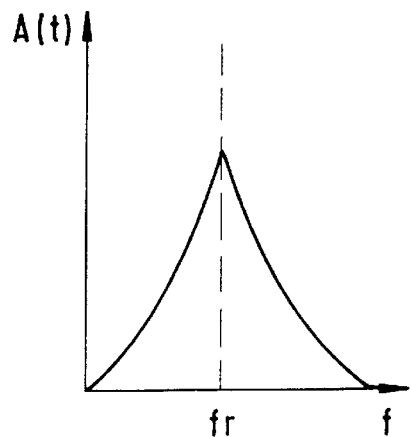
FIG. 9 shows the amplitude of the reception signal.
Figure 10:
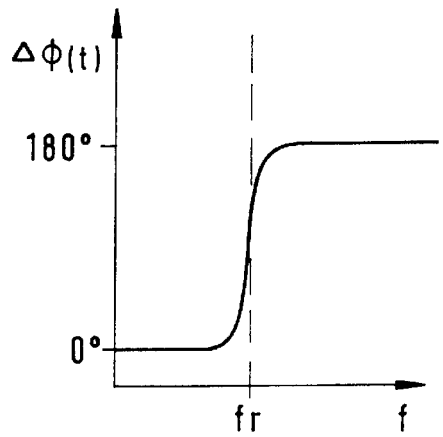
FIG. 10 shows the phase of the reception signal.
Figure 11:
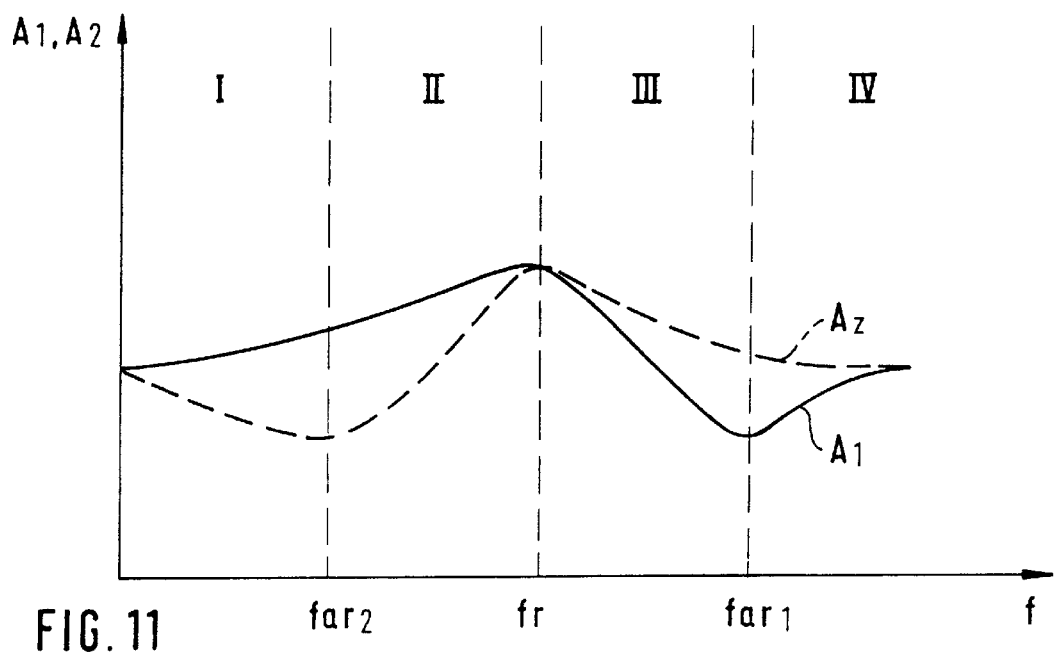
FIG. 11 shows the amplitudes of the two electrical signals of FIGS. 6a and 7a of an arrangement having a low oscillation quality.
Figure 12:
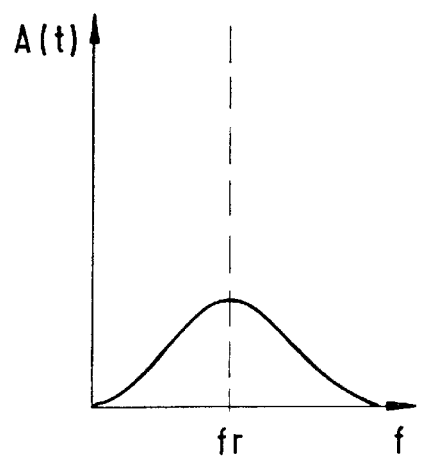
FIG. 12 shows the amplitude of the reception signal of an arrangement having a low oscillation quality.
Figure 13:
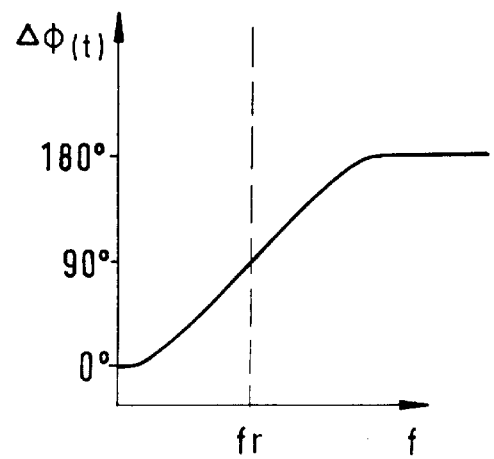
FIG. 13 shows the phase of the reception signal of an arrangement having a low oscillation quality.

The output signal of the operational amplifier 6, that is to say the reception signal E, is the amplitude- and phase-accurate difference between the two electrical signals $E_1$ and $E_2$. For a better understanding, FIG. 11 illustrates the amplitude $A_1$ (f) as a continuous line and the amplitude $A_2$ (f) as a dashed line. FIG. 12 shows the amplitude A(f) and FIG. 13 the phase $\Delta\phi$ (f) of the resulting reception signal E. The values of the phases $\Delta\phi_1$ and $\Delta\phi_2$ of the signals $E_1$ and $E_2$ are indicated in FIG. 8 as a numerical value at the lines.

The table below represents a greatly simplified overview of the amplitudes $A_1$ and $A_2$ of the electrical signals $E_1$ and $E_2$ in the individual regions. In the table, the amplitudes are to be understood as positive magnitudes. The phase relationships are included in a simplified manner by the signs.

|     | $A_1$ | $A_2$ |
| --- | --- | --- |
| I   | $A_{mech1} + A_{M1} + A_{e11}$ | $A_{e12} - A_{M2} - A_{mech2}$ |
| II  | $A_{M1} + A_{mech1} + A_{e11}$ | $A_{M2} - A_{e12} + A_{mech2}$ |
| III | $A_{M1} - A_{mech1} - A_{e11}$ | $A_{M2} + A_{e12} - A_{mech2}$ |
| IV  | $A_{mech1} - A_{M1} + A_{e11}$ | $A_{e12} + A_{M2} - A_{mech2}$ |

In the regions I and II, the first signal $E_1$ has the larger amplitude $A_1$ and is therefore predominant. In the regions III and IV, the second signal $E_2$ has the larger amplitude $A_2$ and is correspondingly predominant there.

The amplitude A of the reception signal E has a single maximum at the resonant frequency $f_r$ of the system and the phase $\Delta\phi$ experiences a sudden phase change by 180° precisely at this resonant frequency $f_r$. This profile corresponds to that of an ideal harmonic oscillator.

If the oscillation quality of the system is reduced, then the amplitude A is altered to the extent that the maximum is less pronounced. A continuous phase increase takes place instead of the sudden phase change. The gradient is lower, the greater the reduction in the oscillation quality is. However, a phase of 90° is always present at the resonant frequency $f_r$, irrespective of the oscillation quality.

FIG. 11 illustrates the amplitude $A_1$ (f) as a continuous line and the amplitude $A_2$ (f) as a dashed line of an arrangement having a low oscillation quality. FIG. 12 shows the amplitude A(f) and FIG. 13 the phase $\Delta\phi$ (f) of the resulting signal E of the arrangement having a low oscillation quality.

The reception signal E present at the output of the operational amplifier 6 is available for evaluation and/or further processing. The amplitude A(f) and phase $\Delta\phi$ (f) of the reception signal have the same profile over the frequency as the actual measurement signal.

In the exemplary embodiment of FIG. 2, the polarization of the first receiver 24a points in the direction facing away from the diaphragm. The second electrode, which is arranged on the surface of the first receiver 24a facing the diaphragm, is connected to the signal line 241a, and the first electrode, which is arranged on the surface of the first receiver 24a remote from the diaphragm, is connected via the line 4 to the reference potential.

Equivalent to this is an arrangement in which the polarization of the first receiver 24a points in the direction facing the diaphragm and the electrode which is remote from the diaphragm is connected to the signal line 241a.

In the exemplary embodiment shown, the polarization of the second receiver 24b likewise points in the direction facing away from the diaphragm. The first electrode, which is arranged on the surface of the second receiver 24b remote from the diaphragm, is connected to the second signal line 241b, and the second electrode, which is arranged on the surface facing the diaphragm, is connected via the line 4 to the reference potential.

Equivalent to this is an arrangement in which the polarization of the second receiver 24b points in the direction facing the diaphragm and the first electrode facing the diaphragm is connected to the signal line.

There are two equivalent connection possibilities for each of the receivers 24a, 24b. Correspondingly, there is a total of four equivalent arrangements. The phases and amplitudes illustrated in FIGS. 3a to 13 exhibit a profile which is essentially the same in all four equivalents.

Figure 14:
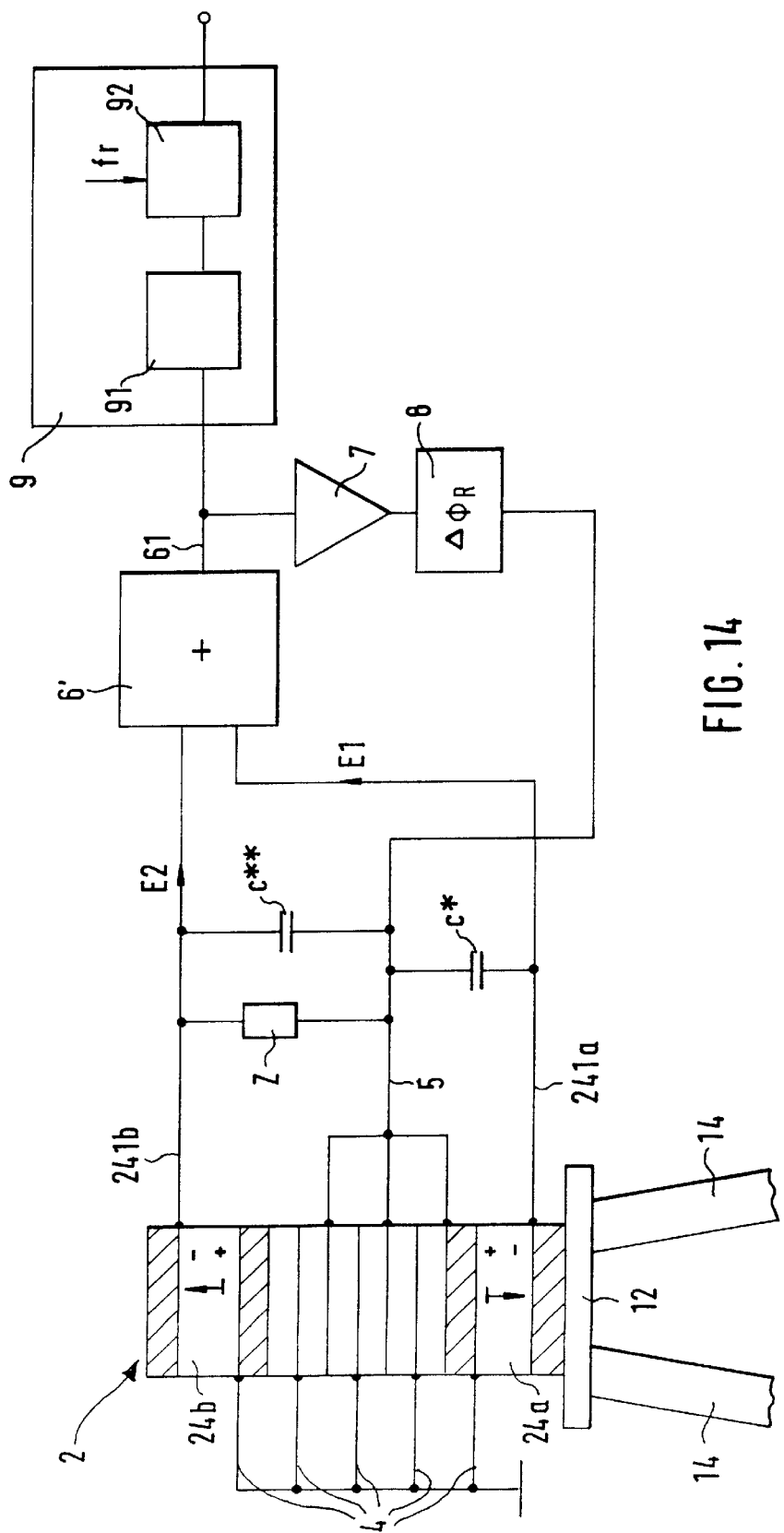
FIG. 14 shows a diagrammatic illustration of the transducer of FIG. 1 and a circuit connected thereto in accordance with a second variant.

A second variant of the invention exists in addition to this first variant. An exemplary embodiment of the second variant is illustrated in FIG. 14. The second variant is to a very great extent identical to the first variant. Therefore, only the differences are described below. One difference consists in the fact that the electrical signal $E_1$ of the first receiver 24a is picked off via a first signal line 241a', which is connected to the first electrode of the first receiver 24a. In exactly the same way as in the first variant, the electrical signal $E_2$ of the second receiver 24b is picked off via a second signal line 241b, which is connected to the first electrode of the second receiver 24b, and the second signal line 241b is connected via an electrical impedance Z to the transmission signal line 5.

A reception signal E is produced from the two electrical signals $E_1$, $E_2$. which reception signal is equal to the sum of the two electrical signals $E_1$, $E_2$. Accordingly, an adder 6' is used instead of the differential amplifier 6 of FIG. 2.

The signal line 241a' of the first receiver 24a is therefore connected to that electrode which is arranged on a surface which bounds the first receiver 24a in the direction of its polarization. In exactly the same way as in the first variant, the second signal line 241b of the second receiver 24b is connected to the electrode which is arranged on a surface which bounds the receiver 24b in the direction of its polarization.

In exactly the same way as in the first variant, four embodiments which are equivalent to the exemplary embodiment of the second variant of FIG. 14 also exist, and they are produced in each case by simultaneously reversing the polarization and interchanging the signal line connections of one of the receivers.

In an arrangement designed in accordance with the second variant, there are differences from the first variant in connection with the signals originating from the first receiver 24a. Thus, the phase of the measurement signal of the first receiver 24a is 180° below the resonant frequency and 0° above the resonant frequency. The phase of the first additional signal of the first receiver is 180°. In an arrangement having a high oscillation quality, a phase of 180° is produced for the first electrical signal of the first receiver in the regions I, II and IV, and a phase of 0° in the region III. The reception signal, which is equal to the sum of the two electrical signals of the receivers, has a phase of 180° below the resonant frequency and a phase of 0° above the resonant frequency.

Of the total of eight arrangements mentioned, the first four arrangements described in accordance with the first variant, in which the reception signal is equal to the difference between the two electrical signals of the receivers, afford the advantage that interference signals, for example background noise, are reduced during the difference formation. By contrast, interference signals of this type may cumulate during summation.

As is illustrated in FIGS. 2 and 14, the resulting reception signal E, which is available at the output of the operational amplifier 6 and of the adder 6', respectively, is fed to a control loop, which produces a fixed phase relationship $\Delta\phi_R$ between the transmission signal and the reception signal E, a difference of 90° in the exemplary embodiment illustrated.

The reception signal E is fed back to the transmission signal via the reception signal line 61, via an amplifier 7 and a phase shifter 8, which shifts its phase by the specific, constant value $\Delta\phi_R$. The amplifier 7 should be dimensioned such that the self-excitation condition is satisfied. The mechanical oscillatory structure is consequently excited by means of the transducer 2 to produce oscillations at its resonant frequency $f_r$. If the oscillatory structure is covered by the charge material, then the resonant frequency $f_r$ has a lower value than if the oscillatory structure oscillates freely. The fixed value of the phase difference $\Delta\phi_R$ is independent of whether or not the oscillatory structure is covered by the charge material.

Furthermore, the reception signal E is applied via the signal line 61 to the input of an evaluation unit 9. Its frequency is determined by means of a frequency-measuring circuit 91 and the result is fed to a comparator 92. The latter compares the measured frequency with a reference frequency $f_R$ stored in a memory. If the measured frequency is less than the reference frequency $f_R$, the evaluation unit 9 emits an output signal which indicates that the mechanical oscillatory structure is covered by a charge material. If the frequency has a value which is greater than the reference frequency $f_R$, then the evaluation unit 9 emits an output signal which indicates that the mechanical oscillatory structure is not covered by the charge material.

The output signal is, for example, a voltage which assumes a corresponding value or a current which has a corresponding value or on which a signal current in the form of pulses having a corresponding frequency or a corresponding duration is superposed.

What is claimed is:

1. An arrangement for establishing and/or monitoring a predetermined filling level in a container, which arrangement comprises:

a mechanical oscillatory structure (1), which is fitted at the level of the predetermined filling level, piezoelectric elements arranged in a stack,
of which at least one is a transmitter (3), to which, during operation, an electrical transmission signal is applied via a transmission signal line (5) and which excites the oscillatory structure (1) to produce mechanical oscillations, of which one is a first receiver (24a) and one is a second receiver (24b), the first and the second receiver (24a, 24b) picking up the mechanical oscillations of the oscillatory structure and converting them into electrical signals ($E_1$, $E_2$), the first and the second receiver (24a, 24b) each having two electrodes, a first electrode of which is arranged on a surface which bounds the receiver (24a, 24b) in the direction of its polarization and a second electrode of which is arranged on a surface which bounds the receiver (24a, 24b) in a direction opposite to its polarization, the electrical signal ($E_1$) of the first receiver (24a) being picked off via a first signal line (241a), which is connected to the second electrode of the first receiver (24a), and the electrical signal ($E_2$) of the second receiver (24b) being picked off via a second signal line (241b), which is connected to the first electrode of the second receiver (24b), an electrical impedance (Z), via which the second signal line (241b) is connected to the transmission signal line (5), and a circuit, which produces a reception signal (E) from the two electrical signals ($E_1$, $E_2$), which reception signal is equal to the difference between the two electrical signals ($E_1$, $E_2$).

2. An arrangement for establishing and/or monitoring a predetermined filling level in a container, which arrangement comprises:

a mechanical oscillatory structure (1), which is fitted at the level of the predetermined filling level, piezoelectric elements arranged in a stack,
of which at least one is a transmitter (3), to which, during operation, an electrical transmission signal is applied via a transmission signal line (5) and which excites the oscillatory structure (1) to produce mechanical oscillations, of which one is a first receiver (24a) and one is a second receiver (24b), the first and the second receiver (24a, 24b) picking up the mechanical oscillations of the oscillatory structure and converting them into electrical signals ($E_1$, $E_2$), the first and the second receiver (24a, 24b) each having two electrodes, a first electrode of which is arranged on a surface which bounds the receiver (24a, 24b) in the direction of its polarization and a second electrode of which is arranged on a surface which bounds the receiver (24a, 24b) in a direction opposite to its polarization, the electrical signal ($E_1$) of the first receiver (24a) being picked off via a first signal line (241a), which is connected to the first electrode of the first receiver (24a), and the electrical signal ($E_2$) of the second receiver (24b) being picked off via a second signal line (241b), which is connected to the first electrode of the second receiver (24b), an electrical impedance (Z), via which the second signal line (241b) is connected to the transmission signal line (5), and a circuit, which produces a reception signal (E) from the two electrical signals ($E_1$, $E_2$), which reception signal is equal to the sum of the two electrical signals ($E_1$, $E_2$).

3. The arrangement as claimed in claim 1, in which the evaluation unit determines the frequency of the reception signal (E), compares this frequency with a reference frequency ($f_R$) and generates an output signal which indicates that the mechanical oscillatory structure (1) is covered by a charge material when the frequency has a value which is less than the reference frequency, and that it is not covered when the value is greater.

4. The arrangement as claimed in claim 1, which has a control loop which regulates a phase difference existing between the electrical transmission signal and the electrical reception signal (E) to a specific, constant value ($\Delta\phi_R$) at which the oscillatory structure oscillates at a resonant frequency ($f_r$).

5. The arrangement as claimed in claim 1, in which the impedance (Z) is a capacitance.

6. The arrangement as claimed in claim 1, in which the impedance (Z) is a resistance, an inductance or a combination of at least one resistance and/or at least one inductance and/or at least one capacitance.

7. The arrangement as claimed in claim 1, in which the first electrode of the first receiver (24a) and the second electrode of the second receiver (24b) are each connected via a line (4) to a reference potential.

8. The arrangement as claimed in claim 2, in which the second electrode of the first receiver (24a) and the second electrode of the second receiver (24b) are each connected via a line (4) to a reference potential.

9. The arrangement as claimed in claim 1, in which the first and the second electrical signal ($E_1$, $E_2$) each contain three components, namely a measurement signal ($E_{M1}$, $E_{M2}$), which is governed by the oscillation of the mechanical oscillatory structure, a first additional signal ($E_{mech1}$, $E_{mech2}$), which is governed by a mechanical coupling between the transmitter (23) and the receiver (24), and a second additional signal ($E_{-11}$, $E_{-12}$), which is governed by an electrical coupling between the transmitter (23) and the receiver (24), and in which the impedance (Z) is determined such that the amplitude ($A_{-12}$) of the second receiver (24b) is greater than the amplitude ($A_{mech1}$) of the first additional signal ($E_{mech1}$) of the first receiver (24a).

10. The arrangement as claimed in claim 9, in which an amplitude- and phase-accurate sum of the first and of the second additional signal ($E_{mech1} + E_{el1}$) of the first receiver (24a) has an amplitude ($A_{\Sigma1}$) which is equal to an amplitude ($A_{\Sigma2}$) of the amplitude- and phase-accurate sum of the first and of the second additional signal ($E_{mech2} + E_{el2}$) of the second receiver (24b).

11. The arrangement as claimed in claim 1, in which an anti-resonant frequency ($f_{ar1}$) of the first receiver (24a) is greater than a resonant frequency ($f_r$) of the mechanical oscillatory structure (1), and in which an anti-resonant frequency ($f_{ar2}$) of the second receiver (24b) is less than the resonant frequency ($f_r$) of the mechanical oscillatory structure (1).

12. The arrangement as claimed in claim 2, in which the evaluation unit determines the frequency of the reception signal (E), compares this frequency with a reference frequency ($f_R$) and generates an output signal which indicates that the mechanical oscillatory structure (1) is covered by a charge material when the frequency has a value which is less than the reference frequency, and that it is not covered when the value is greater.

13. The arrangement as claimed in claim 2, which has a control loop which regulates a phase difference existing between the electrical transmission signal and the electrical reception signal (E) to a specific, constant value ($\Delta\phi_R$) at which the oscillatory structure oscillates at a resonant frequency ($f_r$).

14. The arrangement as claimed in claim 2, in which the impedance (Z) is a capacitance.

15. The arrangement as claimed in claim 2, in which the impedance (Z) is a resistance, an inductance or a combination of at least one resistance and/or at least one inductance and/or at least one capacitance.

16. The arrangement as claimed in claim 2, in which the first and the second electrical signal ($E_1$, $E_2$) each contain three components, namely a measurement signal ($E_{M1}$, $E_{M2}$), which is governed by the oscillation of the mechanical oscillatory structure, a first additional signal ($E_{mech1}$, $E_{mech2}$), which is governed by a mechanical coupling between the transmitter (23) and the receiver (24), and a second additional signal ($E_{-11}$, $E_{-12}$), which is governed by an electrical coupling between the transmitter (23) and the receiver (24), and in which the impedance (Z) is determined such that the amplitude ($A_{-12}$) of the second receiver (24b) is greater than the amplitude ($A_{mech1}$) of the first additional signal ($E_{mech1}$) of the first receiver (24a).

17. The arrangement as claimed in claim 2, in which an anti-resonant frequency ($f_{ar1}$) of the first receiver (24a) is greater than a resonant frequency ($f_r$) of the mechanical oscillatory structure (1), and in which an anti-resonant frequency ($f_{ar2}$) of the second receiver (24b) is less than the resonant frequency ($f_r$) of the mechanical oscillatory structure (1).

* * * * *